(12) United States Patent
Sowley, Jr.

(10) Patent No.: US 9,341,472 B2
(45) Date of Patent: May 17, 2016

(54) FINGER GRIP SPIRIT LEVEL

(71) Applicant: Roy G. Sowley, Jr., Mililani, HI (US)

(72) Inventor: Roy G. Sowley, Jr., Mililani, HI (US)

( * ) Notice: Subject to any disclaimer, the term of this patent is extended or adjusted under 35 U.S.C. 154(b) by 102 days.

(21) Appl. No.: 14/025,624

(22) Filed: Sep. 12, 2013

(65) Prior Publication Data

US 2015/0068053 A1 Mar. 12, 2015

(51) Int. Cl.
*G01C 9/02* (2006.01)
*G01C 9/28* (2006.01)
*G01C 9/26* (2006.01)

(52) U.S. Cl.
CPC ... *G01C 9/26* (2013.01); *G01C 9/28* (2013.01)

(58) Field of Classification Search
CPC .................................. G01C 9/26; G01C 9/28
USPC ............................................. 33/370, 371, 529
See application file for complete search history.

(56) References Cited

U.S. PATENT DOCUMENTS

| | | | | |
|---|---|---|---|---|
| 1,624,684 A * | 4/1927 | Smith | | 33/369 |
| 1,683,509 A * | 9/1928 | Wescott | | 33/451 |
| 1,815,949 A * | 7/1931 | Marischal | | 33/383 |
| 2,680,302 A * | 6/1954 | Standal | | 33/369 |
| 3,113,384 A | 12/1963 | Keszler | | |
| 4,164,817 A | 8/1979 | Walker | | |
| 4,274,208 A | 6/1981 | Yakkel | | |
| 4,589,213 A | 5/1986 | Woodward | | |
| 4,829,676 A | 5/1989 | Waldron | | |
| 5,025,568 A * | 6/1991 | Grimes | | 33/371 |
| 5,408,752 A * | 4/1995 | Eadens | | 33/376 |
| 5,819,425 A | 10/1998 | Payne | | |
| 6,098,298 A * | 8/2000 | Burge | | 33/371 |
| 6,131,298 A | 10/2000 | McKinney | | |
| 6,240,650 B1 * | 6/2001 | Olson | | 33/354 |
| 6,711,827 B2 | 3/2004 | Dougherty | | |
| 6,732,441 B2 | 5/2004 | Charay | | |
| 6,839,973 B1 | 1/2005 | Woodward | | |
| 7,254,920 B2 * | 8/2007 | Steele | | 33/371 |
| 7,290,346 B2 | 11/2007 | Szumer | | |
| 8,061,051 B2 | 11/2011 | Allemand | | |
| 8,484,856 B1 * | 7/2013 | Webb et al. | | 33/371 |
| 2006/0101661 A1 * | 5/2006 | Schmidt et al. | | 33/613 |
| 2006/0123644 A1 * | 6/2006 | Szumer et al. | | 33/374 |
| 2013/0167387 A1 * | 7/2013 | Lueck et al. | | 33/374 |

FOREIGN PATENT DOCUMENTS

WO WO 98/41817 A1 9/1998

* cited by examiner

*Primary Examiner* — Brad Bennett
(74) *Attorney, Agent, or Firm* — Lee Palmateer Law Office LLC; Lee Palmateer

(57) ABSTRACT

A device for measuring the level of the end surface of a pipe, comprising a body, a planar reference surface, and a retractable spring-loaded finger extendable through and below the planar reference surface to engage the inside surface of the pipe and secure the level in place. The level body may comprise an elongated body having an elongated chamber and an elongated reference plane, said plane comprising at least one reference surface and at least one opening to the chamber.

19 Claims, 14 Drawing Sheets

> US 9,341,472 B2

FINGER GRIP SPIRIT LEVEL

TECHNICAL FIELD

The present invention relates to spirit levels and pipe fitting levels.

BACKGROUND OF THE INVENTION

There exist devices for determining the level of pipes (or conduit) and pipe fittings that have means for attachment to the work-piece. Some attach to and measure the level of the wall surface of the pipe or pipe fitting. Another provides a rigid cone-shaped appendage for inserting in the end of the pipe. Others have means for fixed attachment. But none provide a spirit level having a planar reference surface for engaging and measuring the level of the plane defined by the end surface of the pipe and having spring-loaded lingers that are extendable through and below the reference surface and provide outward force to engage the inside surface of the pipe wall so as to create sufficient friction forces to secure the level in place and allow maneuverability of the device in the engaged mode. None can be used as a standard spirit level capable of measuring across an entire pipe diameter on a wide range of diameters. None are as robust, simple to manufacture, simple to use, and unsusceptible to measurement error as the present invention.

Without limiting its definition, the term "pipe" as used herein also encompasses pipe fittings, such as elbows, "T's", unions, couplings or other pipe fittings.

SUMMARY OF THE INVENTION

In a first aspect, the present invention provides a device for measuring the level of the end of a pipe, said device comprising a body, a planar reference surface; and at least one downwardly depending member extending from the body below the plane of the reference surface and having a contact portion for contacting the pipe wall.

In a second aspect, the present invention provides a device for measuring the level of the end of a pipe, said device comprising a body, a planar reference surface on the body; and at least one retractable member retractably connected to the body so as to be movable between a retracted position and a deployed position, said member having a contact portion below the planar reference surface when in the deployed position.

In a third aspect, the present invention provides a level measuring device comprising an elongated body having an elongated chamber and an elongated reference plane, said plane comprising at least one reference surface and at least one elongated opening to the chamber.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

DETAILED DESCRIPTION OF THE INVENTION

Figure 1:
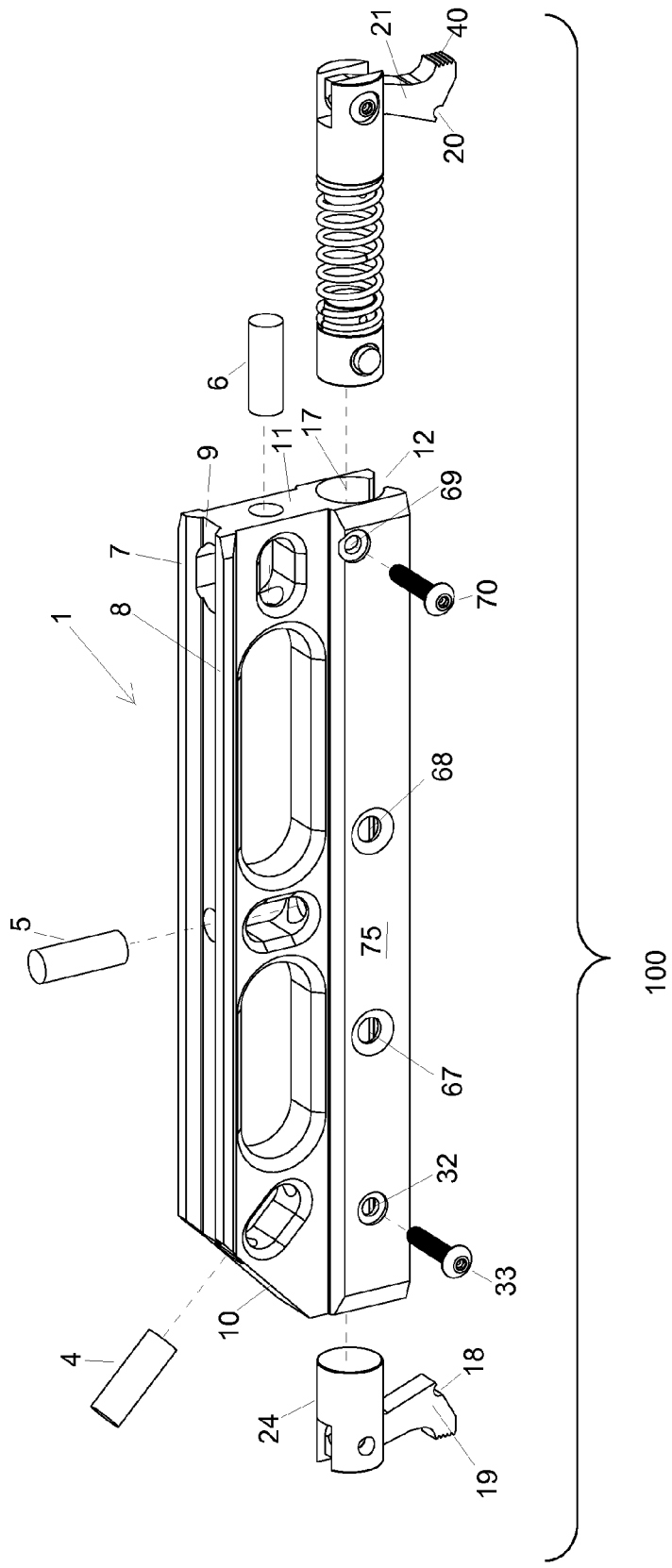
FIG. 1 is a perspective exploded view of a level of the present invention from a vantage point above and in front of the level.

FIG. 1 shows a preferred embodiment of the level of the present invention. The present invention provides an improved spirit level (or bubble level) that can be used as traditional spirit level, but has a chamber and a surface opening for receiving accessory parts that make it uniquely adaptable for different applications, including one preferred embodiment with retractable spring-loaded fingers for gripping the pipe wall for performing level, measurements in pipefitting operations.

The measurement function of the level of the present invention works in the same way as traditional spirit levels which provide a reference plane for engaging the work-piece and a means for indicating level of the reference plane. Said level indication means in traditional spirit levels comprises a plurality of elongated bubble vials indexed at various angles to the reference plane, such as parallel, perpendicular and 45°. The bubble vials contain liquid and a gas bubble, and have markings indicating where the gas bubble will be located when the vial is at horizontal to gravity.

In addition or in the alternative to bubble vials, any other level indication means may be used.

The design of the present invention overcomes certain limitations of currently existing designs. For example, the present invention provides a level of unique versatility with means for receiving a variety of accessory parts. FIGS. 1 through 4 show one embodiment of the present invention adapted for pipe-fitting applications with spring-loaded fingers that grip the inside surface of a pipe wall. This embodiment provides a device for measuring the level of a pipe, using the end surface of the pipe as reference feature to be measured. The fingers provide an attachment means to secure the level in place so the pipefitter has two free hands to perform other operations. Because the level employs friction forces for attachment, it is maneuverable at the same time it is engaged with the work-piece without need for adjusting the attachment means.

FIG. 1 shows an embodiment having two downwardly depending members referred to herein as fingers that are movably attached to the body, but other embodiments may have downwardly depending members that are fixedly attached or integral to the body. Still other embodiments may a single downwardly depending member with sufficient dimension and configuration to contact the work-piece in two locations to hold the level in position on the work-piece. For example, a single member could span the distance between contact surfaces of the two fingers shown in FIG. 1.

Figure 2:
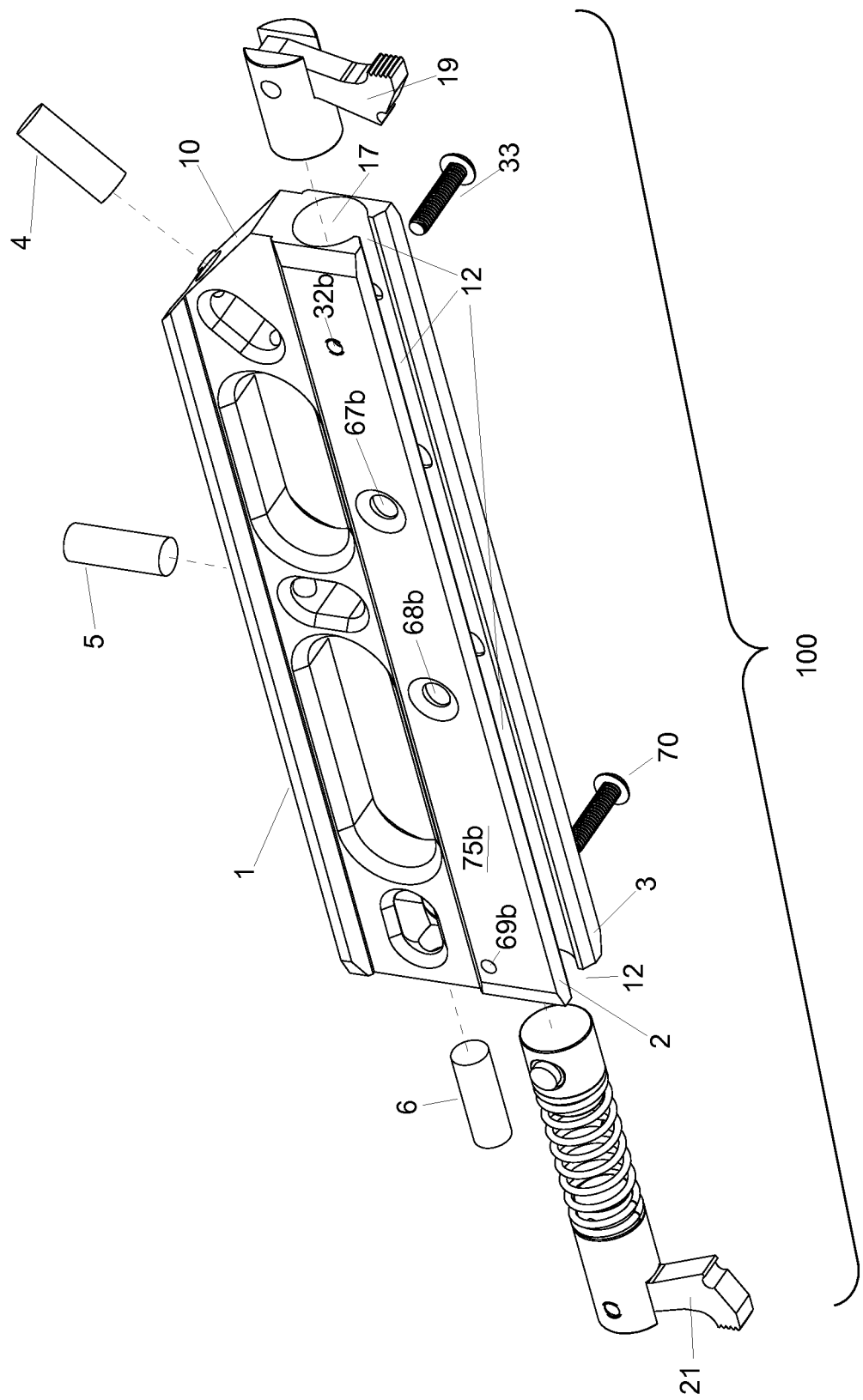
FIG. 2 is a perspective exploded view of the level of FIG. 1 from a vantage point below and on the back side of the level.
Figure 5:
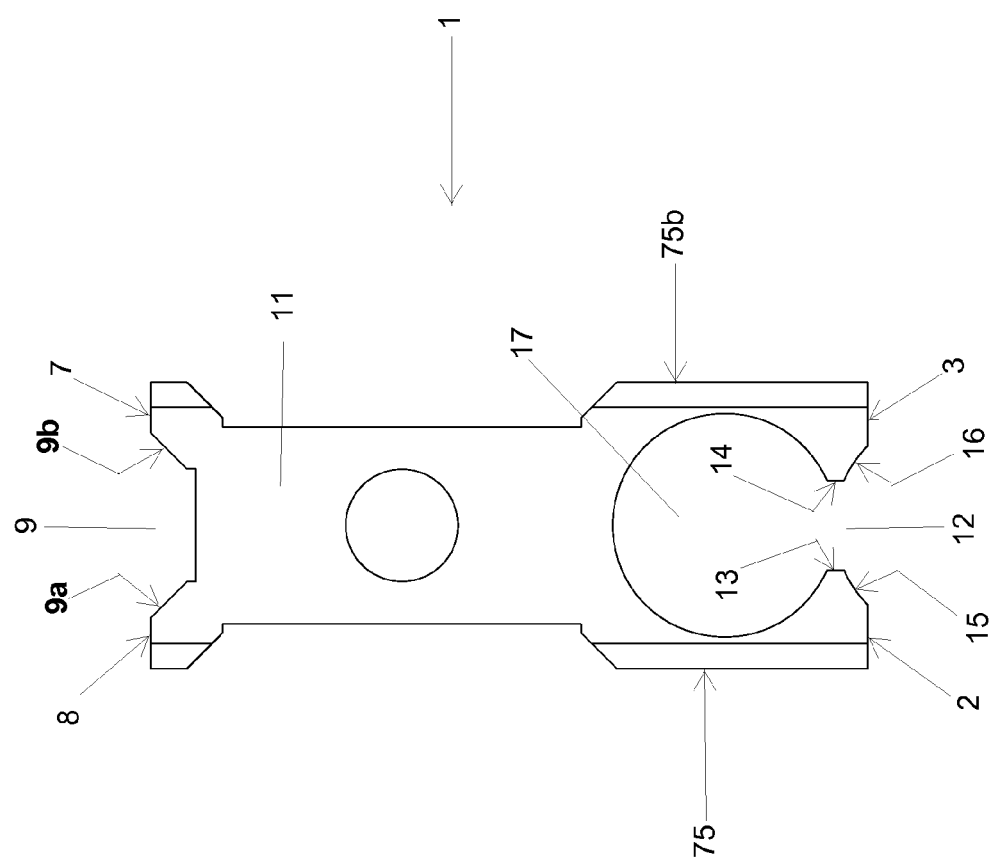
FIG. 5 is a plan view of the right end of the body of the level of FIG. 1.

With reference to FIGS. 1, 2 and 5, which depict a level of the present invention, the level 100 comprises an elongated body 1. The direction of elongation is considered the longitudinal direction herein. The bottom side of the body has co-planar reference surfaces 2 and 3 which define a reference plane, shown horizontal in the figures. The body shown in FIGS. 1, 2 and 5 has substantial symmetry about a vertical plane oriented in the longitudinal direction. Three bubble vials 4, 5 and 6, which are shown in exploded view, are oriented at 45°, perpendicular, and parallel to the reference plane, respectively, and all parallel to the vertical plane. The orientation of the bubble vials and other features of the level are indexed with respect to the reference plane. The top of the body comprises co-planar top surfaces 7 and 8 that are parallel to the reference plane, and sloped surfaces 9a and 9b (FIG. 5) that define a longitudinal v-notch 9 that is symmetrical with respect to the vertical plane of symmetry. The top of the body may comprise magnetic material so that it will be magnetically attracted to pipes containing ferrous materials.

The left end of the body shown in FIG. 1 comprises a sloped surface 10 oriented at 45° to the reference surface. The right end comprises a vertical surface 11. Said top, left and right side surfaces are perpendicular to the vertical plane of symmetry.

Figure 4:
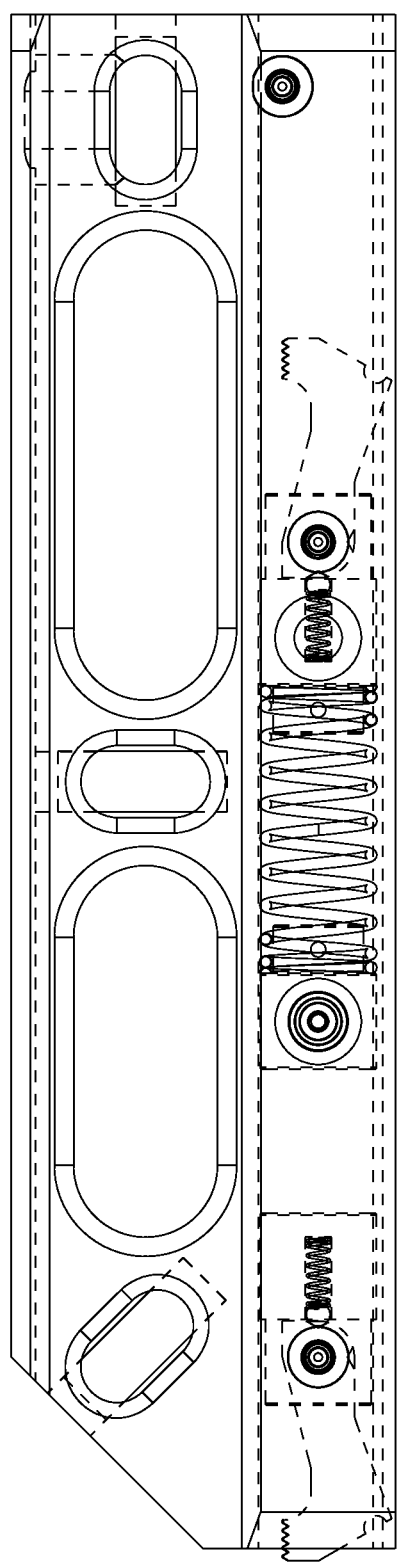
FIG. 4 is a plan view of the front side of the level of FIG. 1, with fingers retracted and some hidden features shown in dashed lines.

The reference plane has an opening 12 defined by vertical surfaces 13 and 14 and arced surfaces 15 and 16 (FIG. 5). Opening 12 provides access to a chamber 17. The concave surfaces provide clearance for improved access to the opening and things located in the opening such as notch 18 of finger 19 and notch 20 of finger 21 by a human finger nail or other instrumentality when fingers 19 and 21 are in their retracted positions as shown in FIG. 4. Thus, deployment of the fingers is made easier.

In further reference to FIGS. 1, 2, and 5, chamber 17 is defined by a cylindrical interior surface of a bore running the length of the body. Although cylindrical in this preferred embodiment, the chamber is not limited to that configuration, and may have any other configuration. For example, it may have a square or rectangular cross section. As shown, the chamber is accessible from the left and right side of the body, but in other embodiments, the chamber may have end walls and interior partition walls.

Figure 10:
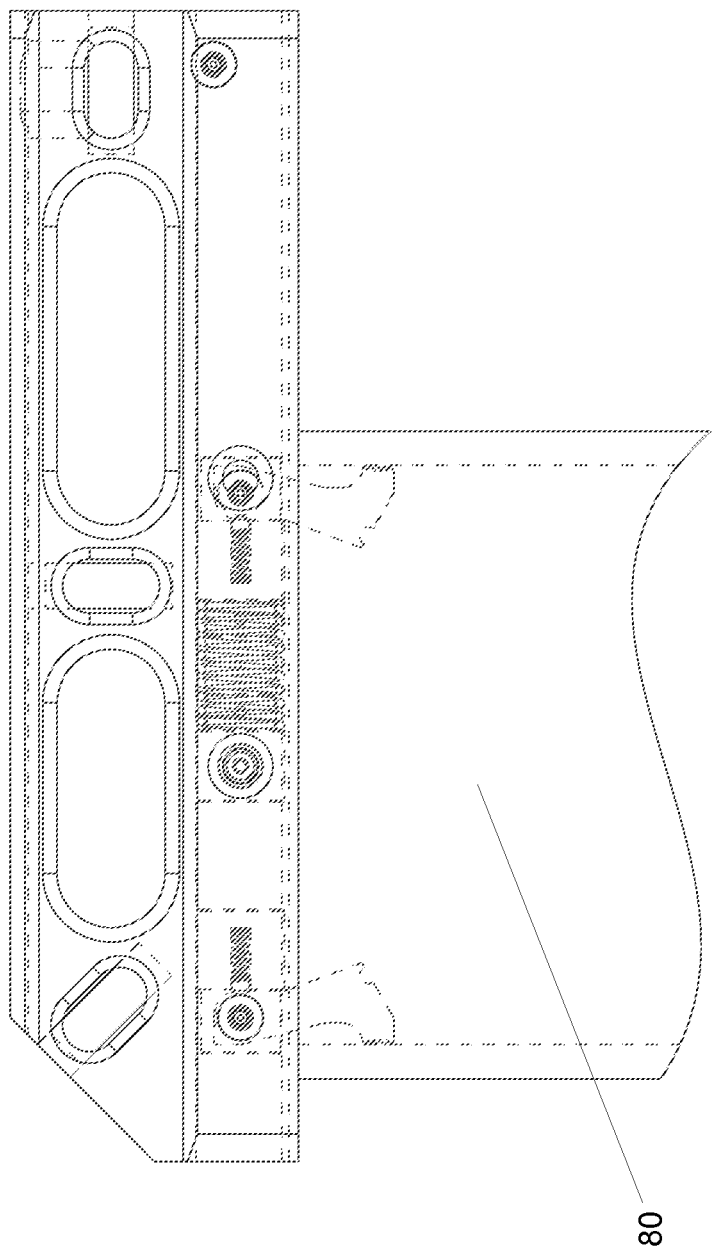
FIG. 10 is a plan view of the front side of the level of FIG. 3 shown engaged with a pipe, with finger spring compressed.
Figure 11B:
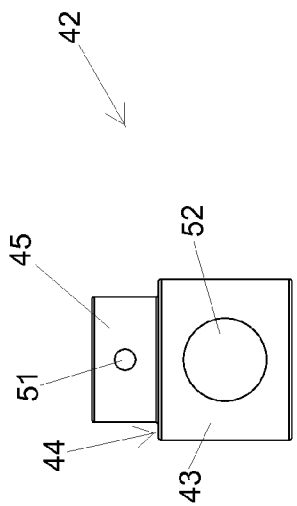
FIG. 11B is a right side plan view of the spring plug of FIG. 11A.
Figure 11D:
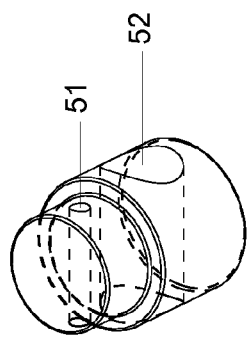
FIG. 11D is a perspective view of the spring plug of FIG. 11A.
Figure 11C:
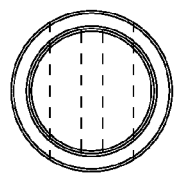
FIG. 11C is a top plan view of the spring plug of FIG. 11A.
Figure 11A:
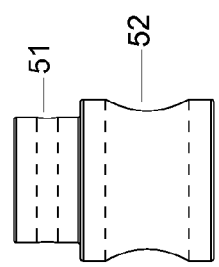
FIG. 11A is a front plan view of the spring plug of the sliding finger assembly of FIG. 7 viewed from above.
Figure 12D:
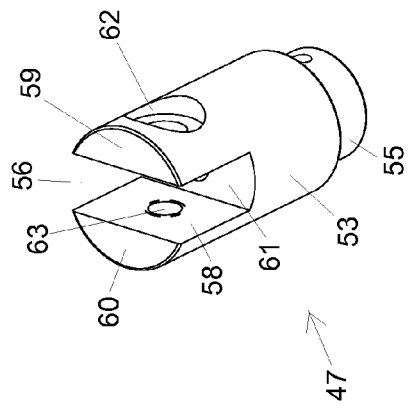
FIG. 12D is a perspective view of the spring plug of FIG. 12A.
Figure 12B:
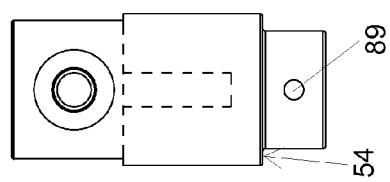
FIG. 12B is a right side plan view of the spring plug of FIG. 12A.
Figure 12C:
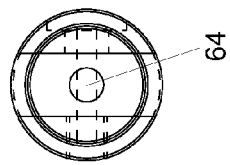
FIG. 12C is a top plan view of the spring plug of FIG. 12A.
Figure 12A:
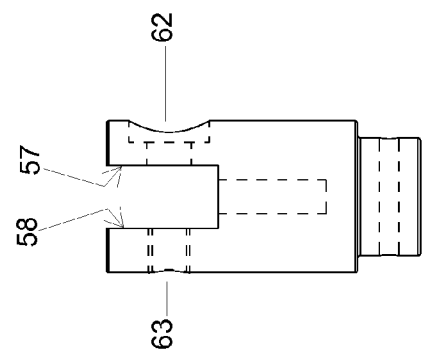
FIG. 12A is a front plan view of the pivot block of the sliding finger assembly of FIG. 7 viewed from above.

The level of the present invention is suitable for measuring the level of a pipe end in its configuration comprising the body and bubble vials, without fingers and other parts described herein. In a preferred embodiment the level further comprises spring-loaded fingers for releasably securing the level to the end of the pipe. FIG. 10 shows the level seated on the end of a pipe with fingers engaged with the inside of the pipe wall. In further reference to FIG. 1, said preferred embodiment is provided with a fixed finger 19 and a sliding finger 21.

Fixed finger 19 is connected to a pivot block 24. Pivot block 24 is cylindrical with an outside diameter slightly less than the diameter of cylindrical chamber 17 so that the block may be inserted into the open end of the chamber on the left side of the body.

Figure 6A:
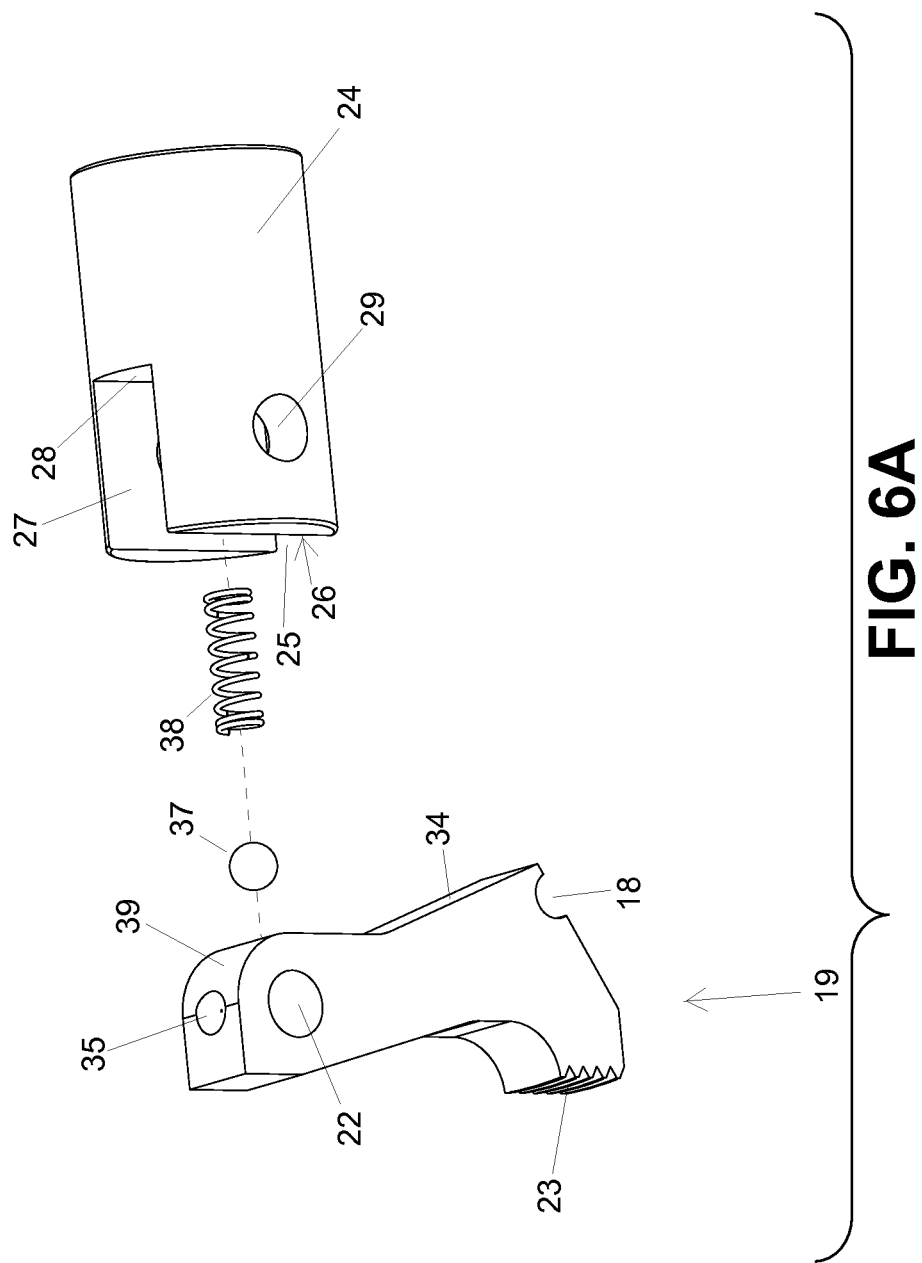
FIG. 6A is an exploded view of the fixed finger assembly of FIG. 1.
Figure 8D:
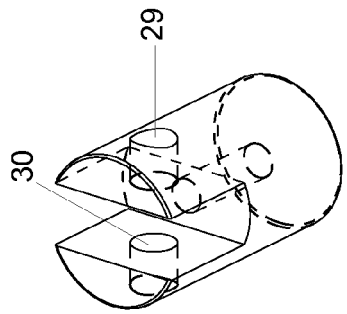
FIG. 8D is a perspective view of the pivot block of FIG. 8A.
Figure 8B:
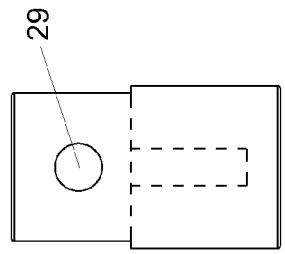
FIG. 8B is a right side plan view of the pivot block of FIG. 8A.
Figure 8C:
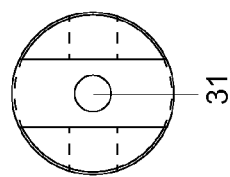
FIG. 8C is a top plan view of the pivot block of FIG. 8A.
Figure 8A:
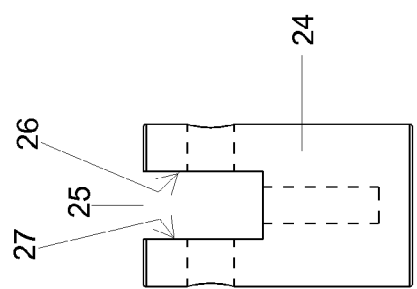
FIG. 8A is a front plan view of the pivot block of the fixed finger assembly of FIG. 6A viewed from above.

With reference to FIG. 6A, which shows an exploded view of the fixed finger assembly with the pivot block, the fixed finger 19 has a connector end with a thru-hole 22, and a contact end with a contact portion and contact surface 23. With reference to FIGS. 6A and 8A through 8D, pivot block 24 has a centered, vertical notch 25 in one end for receiving the connector end of the fixed finder 19. The notch is defined by vertical, opposite-facing surfaces 26 and 27 of two forks and a notch base surface 28. The forks have thru-holes 29 and 30 that are aligned with each other. With reference to FIG. 84 through 8D, the pivot block has a bore hole 31 for slidably receiving a detent spring 38 and detent ball 37 of a detent mechanism (FIG. 6A).

With reference to FIGS. 1, 6A, and 8A through 8D, pivot block 24 is disposed in chamber 17 with opening of notch 25 facing to the left and thru-holes 29 and 30 aligned with thru-hole 32 in the body. The connector end of the fixed finger 19 is disposed in notch 25 with finger thru-hole 22 aligned with pivot block thru-holes 29 and 30. In the preferred embodiment of FIG. 1, a threaded fastener 33 having a threaded shaft of slightly smaller diameter than finger thru-hole 22 is disposed in thru-holes 29, 30 and 32. Thru-hole 32 may be countersunk for receiving the head of the fastener so that the head is recessed below surface 75. All thru-holes in the body may be countersunk so as to eliminate protuberances of threaded fasteners and dual buttons beyond the plane of surface 75. (The counterpart to surface 75 on the opposite side of the level body is represented as 75b). The fastener is threaded into a tapped hole 32b (shown in FIG. 2) on the opposite side of the chamber from thru-hole 32. Thus, the fixed finger is hingedly connected to the level body and pivot block, and the pivot block and finger are fixed to the level body in the longitudinal direction by the threaded fastener. The finger is thus connected to the body and may pivot about the axis of the threaded shaft. Although the preferred embodiment shown uses a threaded fastener, the hinged connection may be provided by any suitable part such as a pin, bolt, or rod.

The fixed finger assembly may be assembled to the level body by sliding pivot block 24 into chamber 17 into proper position and alignment, inserting finger through opening 12 into notch 25, and inserting fastener 33 through thru-holes 29, 30 and 32, and threading the fastener into the tapped hole 32b on the opposite side of the chamber from thru-hole 32.

The fixed finger may pivot between an extended (or "deployed") position and a retracted position. In the deployed position, the contact portion of the finger (i.e., the portion having the contact surface) extends through opening 12 and below the plane in which reference surfaces 2 and 3 lie, with the contact surface facing to the left. Fixed finger is shown in the deployed position in FIGS. 1, 2, 3 and 10.

Figure 3:
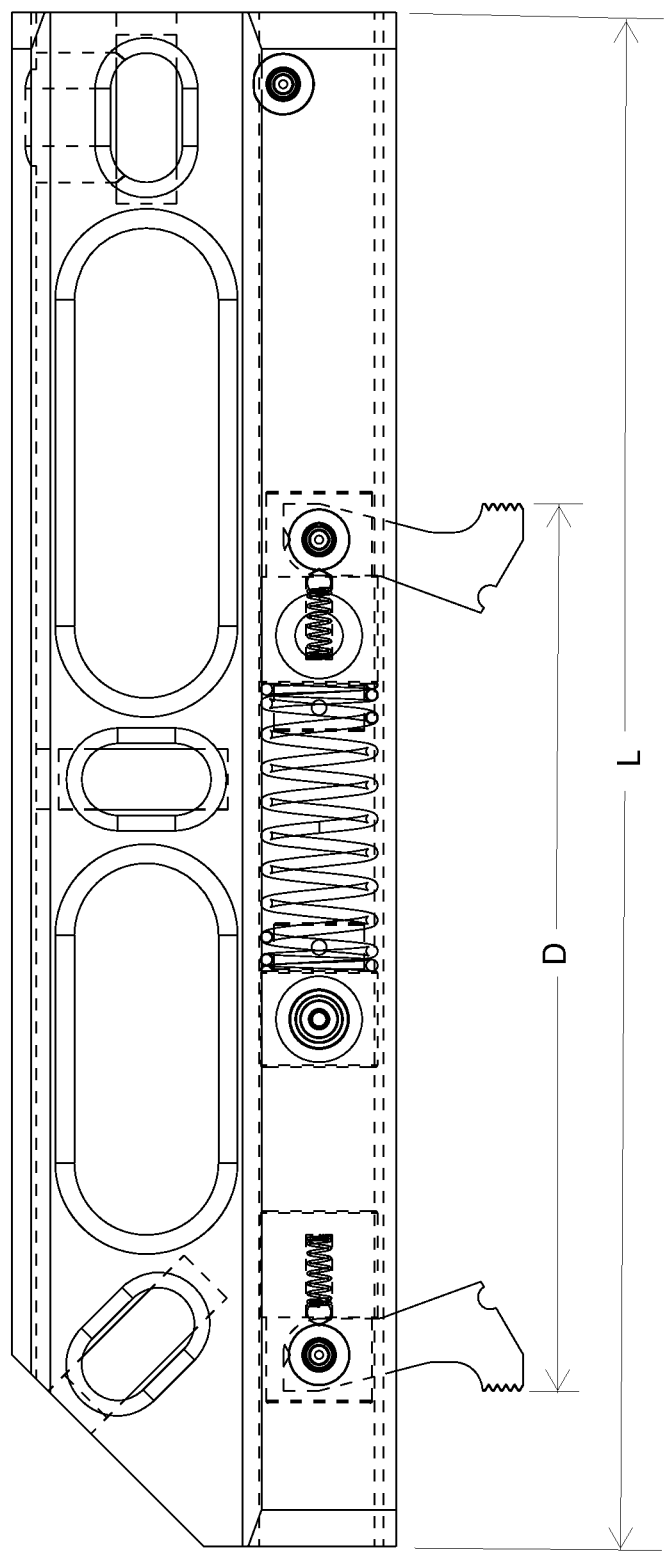
FIG. 3 is a plan view of the front side of the level of FIG. 1, fingers deployed, and some hidden features shown in dashed lines.

In FIG. 3, length "L" of reference surfaces 2 and 3 in the longitudinal direction is greater than distance "D" between the contact surface of the fixed finger and contact surface of the sliding finger. Entire distance D is within length L, and L overlaps D on both ends.

In the retracted position, as shown in FIG. 4, no part of the finger is below the reference plane. From the deployed position, the fixed finger is rotated clockwise to reach the retracted position. From the retracted position, the fixed finger is rotated counterclockwise from the retracted position to reach the deployed position. The finger is releasably held in the fully retracted and fully deployed positions by a detent mechanism, which could be any suitable detent mechanism, one embodiment of which is described below. The finger can be released from the detent positions by applying rotation force to the finger. The force required to release the finger from the detent may be applied with the human finger without undue difficulty.

With reference to FIG. 6A, in its fully deployed position, lower back surface 34 of fixed finger contacts surface 28 of the pivot block at the base of the notch, which prevents further counterclockwise rotation of the fixed finger when the finger is under operational load when engaged with a pipe.

The foregoing indications of direction conform to the view of the level as shown in FIG. 1. It is understood that the level of the present invention may be used in any orientation.

Figure 6B:
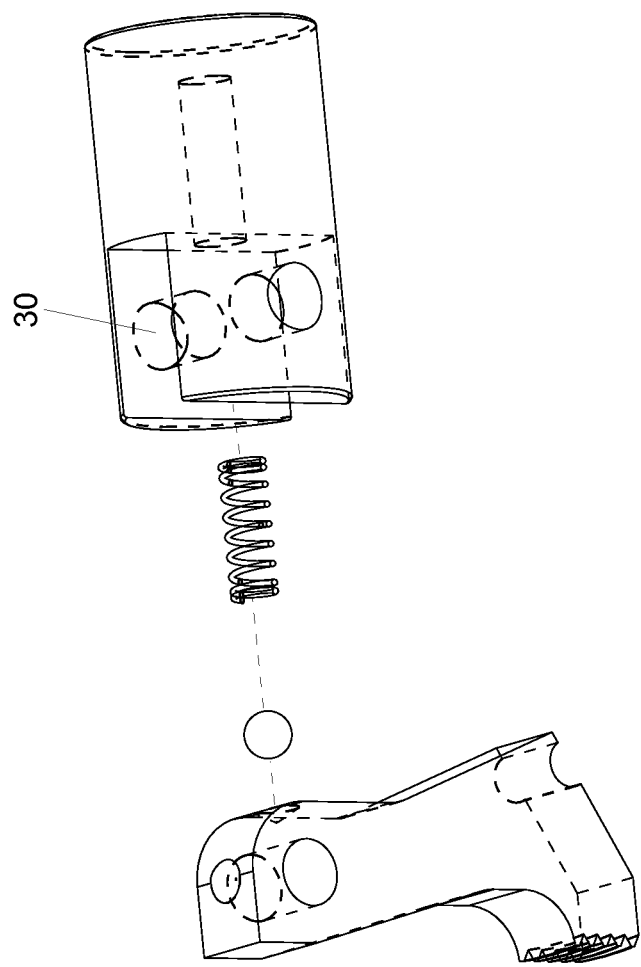
FIG. 6B is the same as FIG. 6A with hidden features shown in dashed lines.

FIG. 6A shows an exploded view of an assembly of the fixed finger, pivot block and detent mechanism of a preferred embodiment of the present invention. With reference to FIG. 6A, the fixed finger has a first indentation 35 and a second indentation 36 (not shown in FIG. 6, shown in FIG. 9), both for receiving, a ball 37 of the detent mechanism. Second indentation is located out of view on the side of the finger facing the detent ball in the exploded view of FIG. 6. The finger has an arced bearing surface 39 between the first and second indentations, the arc of which has a radius centered on the center of thru-hole 22. In the preferred embodiment shown, bearing surface comprises a 9° arc, although in other embodiments it may be different than 90°).

Figure 9:
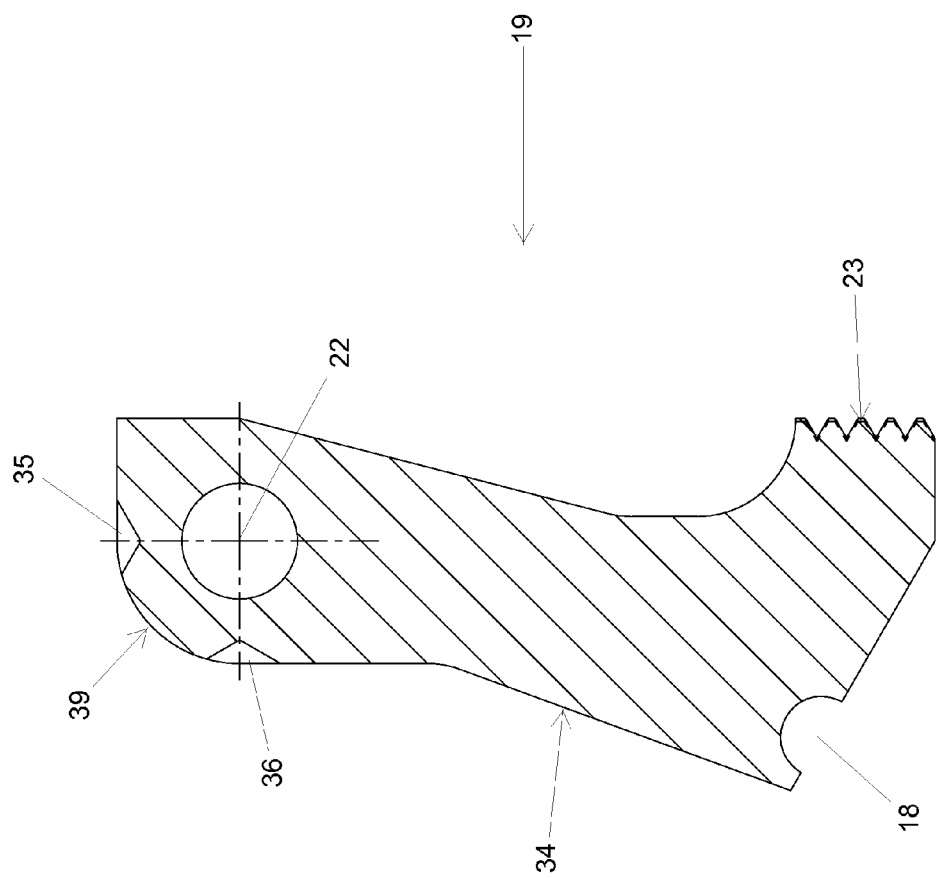
FIG. 9 is a cross sectional view of the fingers shown in FIG. 1 with reference numbers corresponding, to FIG. 6A.

FIG. 9 shows a cross section view of the fingers of the preferred embodiment shown in the figures herein, with reference numbers corresponding to FIG. 6. The two fingers of the preferred embodiment shown are the same shape. The cross section of FIG. 9 is through the center of the finger, bisecting indentations 35 and 36.

With reference to FIG. 6A, the detent mechanism comprises a ball 37 and spring 38. Spring 38 is disposed in bore hole 31 (see FIG. 8A-8D) in the pivot block. The detent ball is disposed between the spring and the fixed finger bearing surface 39. The spring is compressed and pushes the ball against the finger bearing surface, maintaining contact between the ball and the bearing surface. The bearing surface is disposed a sufficiently close distance from surface 28 at the base of notch 25 so that the detent ball remains partially contained in bore 31 throughout the range of finger rotation. When the finger is in the fully retracted or fully deployed positions, the ball aligns with and is pushed into first indentation 35 or second indentation 36 (FIG. 9) respectively. As the finger rotation approaches full retraction or full deployment, the detent mechanism causes the finger to snap in place as the ball rolls or slides over the lip of the indentation.

With reference to FIG. 6A, fixed finger 19 has a notch 18 for receiving a finger nail, a tool, or another object used to apply force to the finger to overcome the detent force so that the finger can be rotated from its retracted position to its deployed position. Thus notch 18 serves much the same purpose as a notch in a jack-knife blade.

Figure 7:
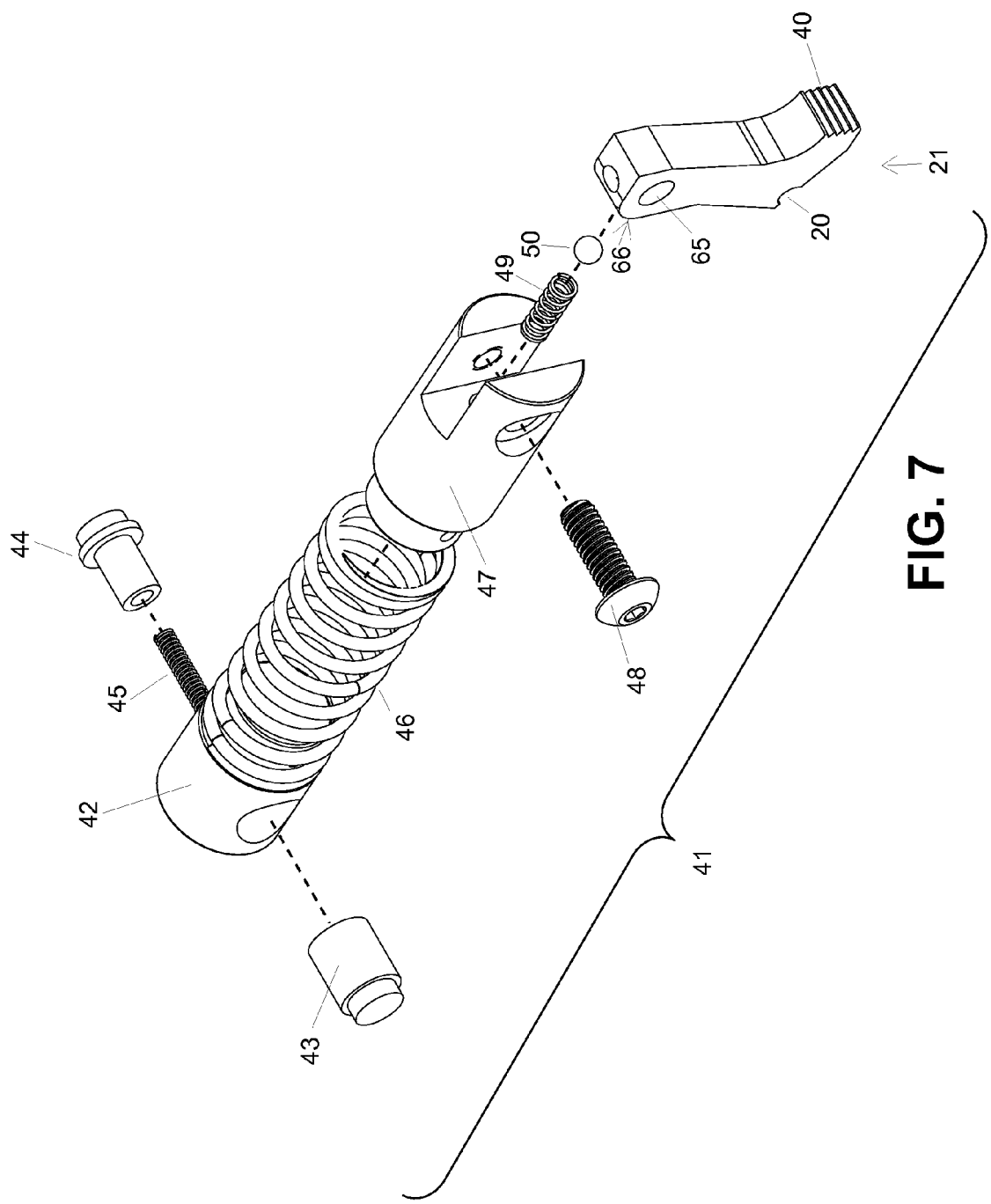
FIG. 7 is an exploded view of the sliding finger assembly of FIG. 1.

With reference to FIG. 1, sliding finger 21 has the same shape as fixed finger 19, but it is facing the opposite direction so that its contact surface 40 faces to the right. With reference to FIG. 7, sliding finger 21 has a thru-hole 65 in its connector end and is part of sliding finger assembly 41 comprising spring plug 42, female dual button 43, male dual button 44, dual button spring 45, finger spring 46, pivot block 47, threaded fastener 48, detent spring 49, detent ball 50, and sliding finger 21. The spring plug is connected to one end of the finger spring. The other end of the finger spring is connected to the pivot block, which is connected to the finger. The dual button parts are disposed in a thru-hole in the spring plug, which provide a means for releasably engaging the level body and connecting, the entire assembly to the level body.

With reference to FIG. 11A-11D, spring plug 42 comprises a body portion 43, shoulder surface 44 and male spring locator portion 45. The diameter of the body portion is slightly less than the diameter of chamber 17 (FIG. 1). The diameter of spring locator 45 is slightly less than the inside diameter of finger spring coil 46 (FIG. 7) so that the spring coil can be disposed over the locator portion, without impeding normal coil movement during spring compressions. In further reference to FIG. 11A-11D, spring plug has a shoulder surface 44 upon which the end of the spring coil may rest. Spring locator portion has a thru-hole 51 for receiving a pin (not shown) or other similar part that protrudes between coils of the finger spring 46 so as to form a mechanical stop that prevents the spring from sliding off the spring locator portion.

The spring plug has a thru-hole 52 for receiving female dual button 43, male dual button 44, and dual button spring 45. With reference to FIG. 7, Male dual button has a button head, flange, shaft, and has a center bore hole for slidably receiving dual button spring 45. Female dual button 43 has a button head, boss, and has a center bore hole (not shown) for slidably receiving male dual button shaft. Dual button spring is disposed in male button bore hole, male dual button shaft is disposed in female dual button bore hole, and the thusly constituted dual button assembly is disposed in spring plug thru-hole 52.

With reference to FIGS. 12A-12D, pivot block 47 has a body portion 53, shoulder surface 54 and male spring locator portion 55. The diameter of the body portion is slightly less than the diameter of chamber 17 (FIG. 1). The diameter of spring locator 55 is slightly less than the inside diameter of finger spring coil 46 (FIG. 7). In further reference to FIG. 12A-12D pivot block has a shoulder surface 54 upon which the end of the finger spring coil may rest. Spring locator portion has a thru-hole 89 for receiving a pin (not shown) or other similar part that protrudes between coils of the finger spring so as to form a mechanical stop that prevents the spring from sliding off the spring locator portion.

Thus, one end of the finger spring is connected to the spring plug, and the other end is connected to the pivot block.

In further reference to FIGS. 12A-12D, pivot block has a centered, vertical notch 56 in one end for receiving the connector end of sliding finder 21. The notch is defined by vertical, opposite-facing surfaces 57 and 58 of two forks 59 and 60, respectively, and a notch base surface 61. Fork 59 has countersunk thru-hole 62, and fork 60 has tapped thru-hole 63, which holes are axially centered with each other. Sliding finger pivot block 47 has a bore hole 64 for slidably receiving a spring and ball of a detent mechanism.

Sliding finger 21, detent spring 45 and detent ball 50 may be assembled to the sliding spring assembly by inserting the detent spring into bore 64, disposing the defeat ball at the outward-facing end of the spring, compressing detent spring so it and ball are disposed in the bore, placing the connector end of finger 21 into notch 56 so that thru-holes 62, 63 and 65 align, inserting threaded fastener 48 through said thru-holes and threading it into threaded thru-hole 63. Finger 21 has a bearing surface 66 that the detent ball contacts as the finger is rotated between deployed and retracted positions. The bearing surface is disposed a sufficiently close distance from the notch-end surface 61 so that the detent ball remains partially inserted in bore 64 throughout the range of rotation of the finger between retracted and deployed positions.

With reference to FIG. 1, sliding finger assembly is slidably disposed in chamber 17 of level body 1 and may slide within the chamber in the longitudinal direction. The finger is disposed through opening 12 so as to prevent rotation of the finger assembly about its longitudinal axis. The chamber surface and the surfaces that define the opening form a channel that guides the sliding finger while it traverses its longitudinal range of motion.

The longitudinal axes of dual buttons 43 and 44 and thru-holes 67 and 68 are horizontally disposed perpendicular to and at the same elevation as the longitudinal axes of the chamber and sliding finger assembly. (See thru-holes 67 and 68 on FIG. 1, the counterparts of which on the opposite side of the level body are represented in FIG. 2 as 67*b* and 68*b*, respectively). When sliding finger assembly is longitudinally disposed so that the dual buttons align with either thru-hole 67 or 68, the dual buttons snap open so that the button heads project into the thin-holes and releasably fix sliding finger spring plug 42 in relation to the level body in the longitudinal direction. The flange of the male dual button and boss of the female dual button have greater outside diameter than the inside diameter of thru-holes 67 and 68 so that the buttons cannot escape through the thru-holes.

The dual buttons may be squeezed with human fingers or any other suitable means to push them back through the thru-holes to release the sliding finger spring plug from the fixed longitudinal position. Thru-holes 67 and 68 may be chamfered. Dual button heads may be contoured in a convex, rounded shape so as to guide the buttons out of the holes, and may have the shape of a spherical cap having a diameter the same as the diameter of chamber 17.

The level body is shown with thru-holes in two longitudinal locations so that the sliding finger assembly can be releasably fixed in two longitudinal locations. However, the level may have thru-holes in any number of locations. Such plurality of hole locations permits variable finger positioning and makes the level useful on a range of pipe diameters.

The sliding finger assembly may be assembled to the level body by sliding it plug-end-first into chamber 17 from the right end of the chamber in the view of FIG. 1. The assembly is slid into proper position and alignment so that button heads of the female and male dual buttons spring into position into body thru-holes 68 and 68*b*, respectively.

In the preferred embodiment shown in FIG. 1, the level further comprises a countersunk thru-hole 69, a tapped hole 69*b* on the opposite side of the chamber 17 therefrom, and threaded fastener 70 disposed through the thru-hole and threaded into the tapped hole. Fastener 70 is a physical barrier preventing sliding spring from exiting the right end of chamber 17 in the longitudinal direction.

The level of the present invention may be used by a pipefitter to measure or indicate the level of the end of a pipe or pipe fitting. To use the level, the pipefitter rotates the fingers into their deployed positions as described above. The pipefitter then slides the sliding finger assembly so the dual buttons align with and snap into the desired thru-hole in the level body. The pipefitter squeezes the dual buttons as needed to pass the sliding finger assembly by a thru-hole to the desired thru-hole. The dual buttons are engaged with the desired thru-hole so that the contact surfaces of the fingers are spaced apart at least a distance equal to the inside diameter of the work-piece (i.e., pipe or conduit). The pipefitter applies force to compress the sliding finger spring so that the contact surfaces of the fingers are spaced apart a distance less than or equal to the inside diameter of the work-piece pipe. The pipefitter then inserts the fingers into the pipe and releases the compression force to permit the spring force to press the fingers outwardly against the inside surface of the pipe wall. The pipe fitter then asserts sufficient force to cause seating contact between the planar surface of the level with the pipe end surface. Alternatively, the pipefitter may seat the planar surface on the pipe end before releasing the compression force.

The compression force may be applied to the fingers directly by hand, or may by applied by engaging the fixed finger with the inside surface of the pipe wall and directly applying force to the sliding spring finger in the longitudinal direction toward the fixed finger, or by engaging the sliding finger with the inside surface of the pipe wall and applying force to the level body in the longitudinal direction toward the spring finger.

The method of using the device of the present invention to measure the level of a pipe end will be intuitive based on the physical features and configuration of the device itself and variations on the foregoing method may omit steps or apply steps in different order.

In the preferred embodiment of FIG. 1 each finger is shaped such that the contact surface 23 (and 40) on the contact portion of the finger is the outward-most surface in the longitudinal direction when the finger is in its deployed position. Thus, each deployed finger contacts the pipe wall at the contact surface while the portion of the deployed finger proximal to the planar surface the "proximal portion" of the finger) does not contact the pipe wall as shown in FIG. 10. As it is an object of the present invention to provide direct measurement of the end of the pipe, it is desirable to ensure flush contact between the planar reference surface of the level with the end of the pipe. Thus, the controlling measurement interface between the level and pipe is the interface between the reference surfaces and the pipe end. It would be undesirable for interference between the fingers and the pipe walls to hinder or obstruct achievement of this interface. It would also be undesirable for such interference to cause local deformation of the pipe end, which would introduce a source of measurement inaccuracy. It would be undesirable for a part of the level to engage the corner formed by the pipe end and pipe wall, such as might happen when a tapered or conical object is force-fit into the end of a pipe. These undesirable affects are avoided with the design of the present invention.

The improved level provides for direct measurement of the pipe end via direct seating contact with the level's planar reference surfaces, across the entire diameter of the pipe, while simultaneously providing a means for securing the level to the pipe via mechanical contact with the pipe wall, which contact location is offset a distance away from the pipe end. Offsetting the contact points away from the pipe end eliminates the stresses, strains, and deflections that can be imparted upon the pipe and the level which can introduce inaccuracies in the measurement. The mode of measurement contact between the level reference surface and pipe end surface (i.e., seating contact with forces normal to the mating surfaces) is largely uncoupled from the mode of connection between the fingers and pipe wall so that the connection mechanism does not introduce measurement inaccuracy.

The preferred embodiment of the level of the present invention is self-centering so that the longitudinal axis of the level is aligned along the diameter of the pipe. Since the spring forces on the fingers are along the longitudinal axis of the level, the spring forces are directed along the pipe diameter, resulting in strength, stability, symmetry, and improved measurement. As engagement forces are friction forces in the directions tangential to the finger contact surface and pipe wall surface, the level may be maneuverable by hand while it is engaged to the pipe, without having to release or adjust the engagement forces. For example the level may be rotated on the end of the pipe without disengagement and without adjusting spring force.

The fingers may be made of any solid material, and may be made of metal, wood, plastic, or other synthetic material. The finger contact surfaces 23 and 40 may be smooth and of the same material as the rest of the finger, or they may be enhanced to increase friction. Enhancement may be in the form of surface features such as knurls, striations, corrugation, ridges, grooves, dimples, or course surface roughness. Alternately, or in combination therewith, surface enhancement may be by application of softer materials, such as rubber coating, sheathing or padding. The finger contact surfaces may be rounded to conform to the contour of the pipe wall.

The outward spring force exerted by the level against the inside surface of the pipe wall at the finger contact surfaces causes sufficient friction force to hold the level in place. The amount of spring force ("F" lbs.) is a function of the spring constant ("k" lbs./in.) and amount of spring deflection ("x" in.). Greater spring constant causes greater force for a given deflection, and greater deflection causes greater force for a given spring constant. For simple helical springs, as in a preferred embodiment of the present invention, the function is $F=kx$.

The amount of holding force that the level applies to the pipe can therefore be regulated by choice of spring, i.e., choice of spring constant. Holding force may also be regulated by selecting the distance to space apart the fingers. i.e., by selecting which thru-hole to align the dual buttons with. Greater finger spacing will require greater spring compression distance (i.e., displacement) to make the fingers fit within the pipe, and therefore create greater outward spring force against the inside surface of the pipe wall. Greater spring force will cause greater friction force between the finger contact surfaces and the inside surface of the pipe wall, and thus greater holding force.

The level of the present invention may be manufactured in various sizes and dimensions for optimal fit and function with various sized pipe. Performance characteristics of the selectively sized level may thus be more predictable to designers and repeatable in the field.

In an alternate embodiment, the fingers may have opposing contact surfaces so that one finger contacts the outside of the pipe wall while the other finger contacts the inside of the pipe wall, a single pipe wall thickness away, so as to pinch the pipe wall between the fingers. For example, with reference to FIGS. 1, 3 and 4 the fixed finger assembly and sliding finger assemblies may each individually be rotated about a vertical axis 180 so that they are disposed in chamber 17 with the notched ends of their respective pivot blocks facing inward toward each other. In one such embodiment, the level would be engaged to the pipe with the fixed finger contacting the outside of the pipe wall and the sliding finger contacting the inside of the pipe wall.

In another alternate embodiment, at least one finger may have inward facing contact surfaces, and the pivot block for such finger may configured so as to facilitate inward engagement force applied on the external surface of the pipe or other work-piece. In such embodiment, the finger spring may operate in tension (instead of compression) so as to provide inward spring force.

Figure 13:
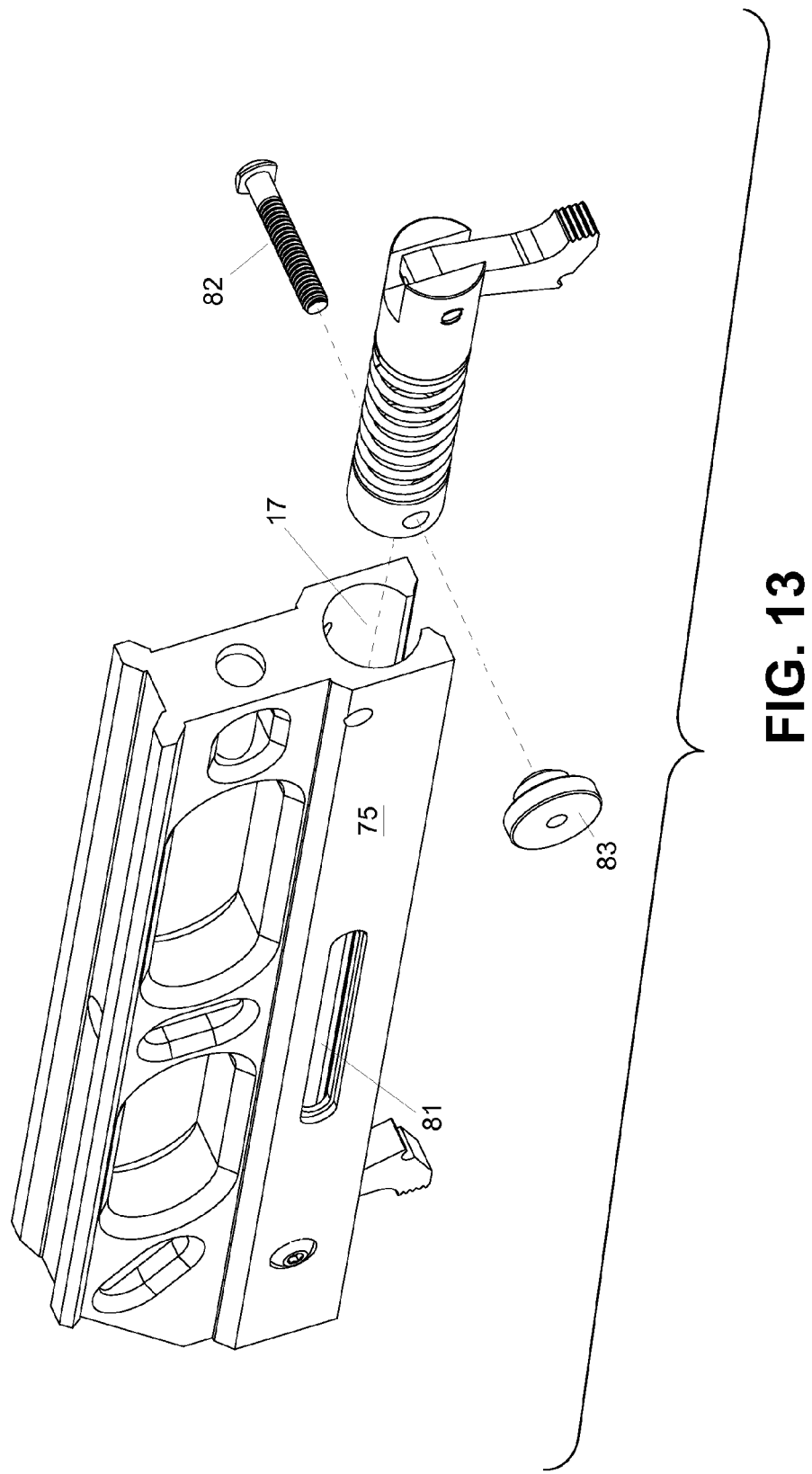
FIG. 13 is a perspective exploded view of an alternate embodiment level of the present invention.

With reference to FIG. 13, in an alternate preferred embodiment, in lieu of thru-holes 67 and 68 shown in FIG. 1, the body is provided with an elongated slot 81 in the side-wall of chamber 17. In lieu of the spring plug and dual button design of the embodiment shown in FIG. 1, the spring plug of this alternate embodiment is configured to receive a threaded fastener. In lieu of a dual button, the alternate embodiment has a threaded fastener disposed through the slot and connected to the spring plug. Thus, in the alternate embodiment, the sliding finger assembly may be releasably fixed to the body by tightening the threaded fastener. In FIG. 13 the fastener comprises a threaded shaft 82 and a separate thumb nut 83. The thumb nut can be finger-tightened against the outside of the chamber wall, which tightens the spring plug against the interior surface of the wall of chamber 17. Thus, in the alternate embodiment, the sliding finger assembly may be variably positioned anywhere along the length of the slot by loosening the fastener, sliding the assembly to the desired location, and retightening the fastener. The slot may be countersunk so that the fastener and bolt do not protrude beyond surface 75 of the body.

The fastener could be a thumb screw with and rounded head integral with a threaded shaft that is disposed through the slot and threaded into a tapped hole in the spring plug. Instead of a threaded fastener, any acceptable tightening means could be use, such as a shaft and quick-release lever similar to a quick release lever on a bicycle wheel.

The outside diameter of the finger spring may be smaller than the diameters of the spring plug and pivot block, and the pivot block diameter may be smaller than the spring plug diameter, so that the spring and pivot block do not bind against the chamber wall when spring plug contacts the chamber wall.

In an alternate embodiment, the spring force may be provided by deflection of the finger itself, which may be sufficiently elastic that it may be able to withstand significant lateral deflection without experiencing plastic deformation. In another alternate embodiment, the finger may have a spring bias radially that exerts force against rotation of the finger about its axis of rotation. Radial spring bias could be by torsion, spring, clock spring, torsion bar, or other suitable means.

In various embodiments, the level could comprise any combination of finger types, such as fingers that are integral to the body, retractable, spring loaded, slidable, or rotatable, and fingers that have combinations of the foregoing features.

Those with ordinary skill in the art would understand that levels may be used to measure the level of a flat surface or multiple features of a single work-piece, or measure the level of a plurality of work-pieces with respect to each other, such as the level of two adjacent or spaced-apart blocks. The fingers of the level of the present invention could engage opposing surfaces of the work-pieces to hold the level in place.

While the invention has been particularly shown and described with reference to certain embodiments, it will be understood by those skilled in the art that various changes in form and details may be made to the invention without departing, from the spirit and scope of the invention as described in the following claims.

I claim:

1. A level for measuring the level of a pipe end comprising:
    a body;
    a planar reference surface having an opening; and
    at least one downwardly depending member extending from the body below the plane of the reference surface through said opening and having a contact portion for contacting the pipe wall.

2. The level of claim 1, wherein at least one of the at least one downwardly depending members is spring-biased so that it imparts a lateral force against the pipe wall when the planar reference surface is in contact with the pipe end.

3. The level of claim 1 wherein the at least one downwardly depending member comprises:
   a proximal portion proximal to the plane of the reference surface; and
   the contact portion is below the proximal portion and protrudes laterally from the proximal portion so that the proximal portion cannot make contact with the pipe wall when the contact portion makes contact with the pipe wall.

4. The level of claim 1, wherein the body is elongated in a longitudinal direction parallel to the planar reference surface, further comprising:
   a spring having a first connection to the body and a second connection to at least a first one of the at least one downwardly depending member so that the spring may impart a force against longitudinal displacement of the first downwardly depending member.

5. The level of claim 4 wherein the first downwardly depending member is slidably connected to the body so that it may move in the longitudinal direction of the body and is connected to the spring so that the spring may impart a force against longitudinal displacement of the first downwardly depending member.

6. A level for measuring the level of a first surface of a work-piece comprising:
   a body;
   a planar reference surface on the body;
   at least one retractable member retractably connected to the body so as to be movable between a retracted position and a deployed position, said member having a contact portion below the planar reference surface when in the deployed position.

7. The level of claim 6 wherein the at least one retractable member comprises a proximal portion that is proximal to the plane of the reference surface when the member is in the deployed position, said contact portion being below the proximal portion and protruding laterally from the proximal portion when the member is in the deployed position.

8. The level of claim 6 wherein at least one of the at least one retractable member further comprises a connector end, said member being hingedly connected to the body at its connector end so as to be rotatable between a retracted position and a deployed position.

9. The level of claim 6 further comprising a spring having a first connection to the body and a second connection to at least a first one of the at least one retractable member so that the spring imparts a force against longitudinal displacement of the member.

10. The level of claim 8 further comprising a spring having a first connection to the body and a second connection to the connector end of the at least one rotatable member so that the spring imparts a force against longitudinal displacement of the rotatable member.

11. The level of claim 10 wherein:
    the body has a longitudinally disposed channel;
    the planar reference surface has a longitudinal opening to the channel;
    the spring is disposed in the channel;
    the connector end of the at least one rotatable member is disposed in the channel so as to be slidable in the longitudinal direction in the channel; and
    the rotatable member extends through the opening in its deployed position so that the contact portion is below the reference surface.

12. The level of claim 11 wherein the second connection comprises:
    a pivot block slidably disposed in the channel, said pivot block connected to the spring; and
    said rotatable member hingedly connected at its connector end to the pivot block so as to be rotatable between at least the retracted position and the deployed position.

13. The level of claim 12 further comprising:
    at least one thru-hole in the side walls of the channel;
    wherein said first connection comprises a spring plug connected to the spring, said spring plug slidably disposed in the channel and having at least one spring-loaded button for releasably engaging said at least one thru-hole.

14. The level of claim 13 wherein the at least one thru-hole comprises a plurality of thru-holes that are space apart in the longitudinal direction so that the spring plug may be releasably fixed at variable longitudinal locations.

15. The level of claim 12 further comprising:
    at least one elongated slot in at least one side wall of the channel;
    wherein said first connection comprises a spring plug connected to the spring, said spring plug slidably disposed in the channel; and
    a means disposed through the slot and connected to the spring plug for releasably tightening the spring plug to the channel wall.

16. The level of claim 15 wherein said means comprises a threaded fastener.

17. The level of claim 16 wherein said threaded fastener comprises a thumb screw.

18. The level of claim 15 wherein said means comprises a quick-release lever.

19. The level of claim 1 wherein at least one of the at least one downwardly depending member is movable between a first position at which its contact portion is a lateral distance from the pipe wall and a second position at which its contact portion is in contact with the pipe wall.

* * * * *